(12) United States Patent
Grendahl

(10) Patent No.: US 10,566,770 B2
(45) Date of Patent: Feb. 18, 2020

(54) REUSABLE ELECTRICAL PANEL COVER WITH BREAKAWAY EDGES

(71) Applicant: Mark Grendahl, Apple Valley, MN (US)

(72) Inventor: Mark Grendahl, Apple Valley, MN (US)

( * ) Notice: Subject to any disclaimer, the term of this patent is extended or adjusted under 35 U.S.C. 154(b) by 0 days.

(21) Appl. No.: 16/127,505

(22) Filed: Sep. 11, 2018

(65) Prior Publication Data

US 2019/0081467 A1    Mar. 14, 2019

Related U.S. Application Data

(60) Provisional application No. 62/558,626, filed on Sep. 14, 2017.

(51) Int. Cl.
| | |
|---|---|
| *H02B 1/44* | (2006.01) |
| *H02B 1/52* | (2006.01) |
| *H02G 3/08* | (2006.01) |
| *H02G 3/14* | (2006.01) |

(52) U.S. Cl.
CPC ............... *H02B 1/44* (2013.01); *H02G 3/081* (2013.01); *H02B 1/52* (2013.01); *H02G 3/14* (2013.01)

(58) Field of Classification Search
CPC ...................... Y10T 428/15; Y10T 428/24479

USPC ..................................... 361/600–678; 428/43
See application file for complete search history.

(56) References Cited

U.S. PATENT DOCUMENTS

| | | | | |
|---|---|---|---|---|
| 2,878,955 A * | 3/1959 | Hagan | ..................... | H02B 1/40 220/3.9 |
| 3,983,311 A * | 9/1976 | Brumfield | .............. | H02G 3/083 174/50 |
| 5,886,868 A * | 3/1999 | White | .................... | H02B 1/066 361/652 |
| 8,460,772 B1 * | 6/2013 | Huddleston | ............ | A62C 13/78 428/156 |
| 10,398,047 B2 * | 8/2019 | Thompson | ............... | H05K 5/03 |
| 2018/0198262 A1 * | 7/2018 | Burks | .................... | H02B 1/306 |

* cited by examiner

*Primary Examiner* — Zachary Pape
(74) *Attorney, Agent, or Firm* — Dakota Law, P.L.L.C.; Gary L. Huusko

(57) ABSTRACT

A reusable electrical panel cover for protecting an electrical panel box made of a sturdy rectangular box-shaped panel cover with two length-edge sides and two width-edge sides, a front, a plurality of small openings for attaching the reusable electrical panel cover to an electrical panel box, at least one cutout in the front for access through the reusable electrical panel cover to the electrical panel, and at least one breakaway portion on one width-edge side and at least one breakaway portion on one length-edge side, with each breakaway portion having a breakaway edge.

4 Claims, 3 Drawing Sheets

REUSABLE ELECTRICAL PANEL COVER WITH BREAKAWAY EDGES

This application claims the filing date of and relates to the provisional application by the same inventor, Ser. No. 62/558,626 filed on Sep. 14, 2017.

BACKGROUND OF THE INVENTION

This invention relates to a temporary and reusable electrical panel cover with breakaway edges and an optional electrical device support.

SUMMARY OF THE INVENTION

The reusable electrical panel cover protects non-energized and energized electrical panels during the construction phases of a building project. The reusable electrical panel cover comprises a sturdy rectangular box-shaped panel cover, the panel cover comprising two length-edge sides and two width-edge sides, a front, a plurality of small openings for attaching the reusable electrical panel cover to an electrical panel box, at least one cutout in the front for access through the reusable electrical panel cover to the electrical panel, and a plurality of breakaway portions on one width-edge side and a plurality of breakaway portions on one length-edge side, the breakaway portions each having a breakaway edge,. The plurality of small openings can be circular holes, elongated holes, or other cutout openings sufficient to allow a screw or other attaching means to attach the reusable electrical panel cover to the electrical panel box. The at least one cutout for access through the reusable electrical panel cover to the electrical panel can be pre-cutout or semi-cutout to be punched out onsite.

The breakaway portions allow the electrical panel to be used with electrical panel boxes of varying dimensions. Ordinarily, electrical panel boxes are manufactured in up to four sizes. The three breakaway portions on the length-edge and width-edge sides allow the electrical panel to fit each of the customary dimensioned electrical panel boxes. One or more of the breakaway portions can be broken off the length-edge side and/or the width-edge side to accommodate use for a variety of electrical panel boxes.

After the installation of the electrical panel it is frequently damaged by sheetrock, dust, plaster, paint and other debris. If the permanent panel cover is immediately installed, this too may be damaged or lost during construction. The reusable electrical panel cover eliminates safety and code violations, and potentially costly repairs to the panel, wiring, and breakers. Additionally, the reusable electrical panel cover provides the optional ability to install an electrical device needed for temporary power throughout construction, thus complying with OSHA Safety Standard and other building construction, electrical, and other applicable codes. The electrical panel cover provides more space under the electrical panel cover to accommodate necessary and additional electrical panel-type equipment.

The reusable electrical panel cover can be made from sturdy material such as steel, aluminum, or plastic. The reusable electrical panel cover may be machine tooled using stamping or laser methods or, if made of plastic, can be plastic injection molded. Alternatively, it may be hand tooled using the materials previously listed. Another embodiment of the invention would comprise impressions applied to the main body of the cover to provide rigidity.

The breakaway portions would be stamped or otherwise manufactured such that each portion could be easily broken off, such as having a thinner material along the breakaway edge.

Another embodiment of the reusable electrical panel cover comprises an electrical device pre-installed and supported in the cutout for access through the reusable electrical panel cover. The electrical device can be a non-GFIC, a GFIC, or other electrical outlet means.

Yet another embodiment would include a raised portion of the front of the electrical panel creating more volume for the electrical panel box, thus allowing more electrical panel box equipment to fit inside the electrical panel box.

DETAILED DESCRIPTION OF DRAWING

FIG. 1 shows the reusable electrical panel cover 1 comprising a sturdy rectangular box-shaped panel cover 2, two length-edge sides 3, two width-edge sides 4, a plurality of small openings 5 for attaching the reusable electrical panel cover to an electrical panel box, at least one cutout 6 for access through the reusable electrical panel cover to the electrical panel, a plurality of breakaway portions 7 and a plurality of breakaway edges 8.

Figure 1:
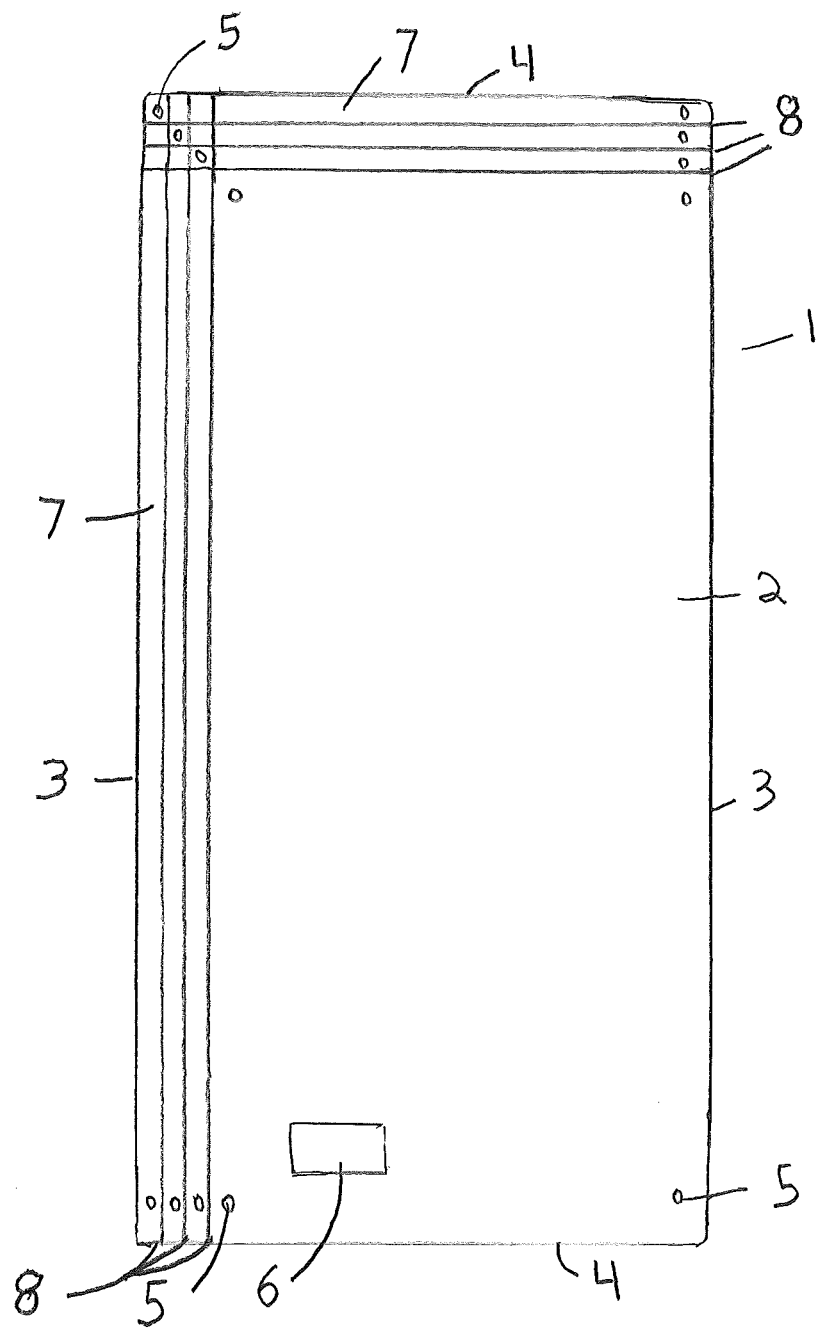
Figure 2:
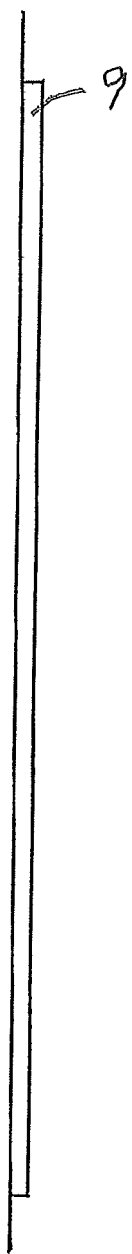
FIG. 2 is a side view showing a raised portion 9.
Figure 3:
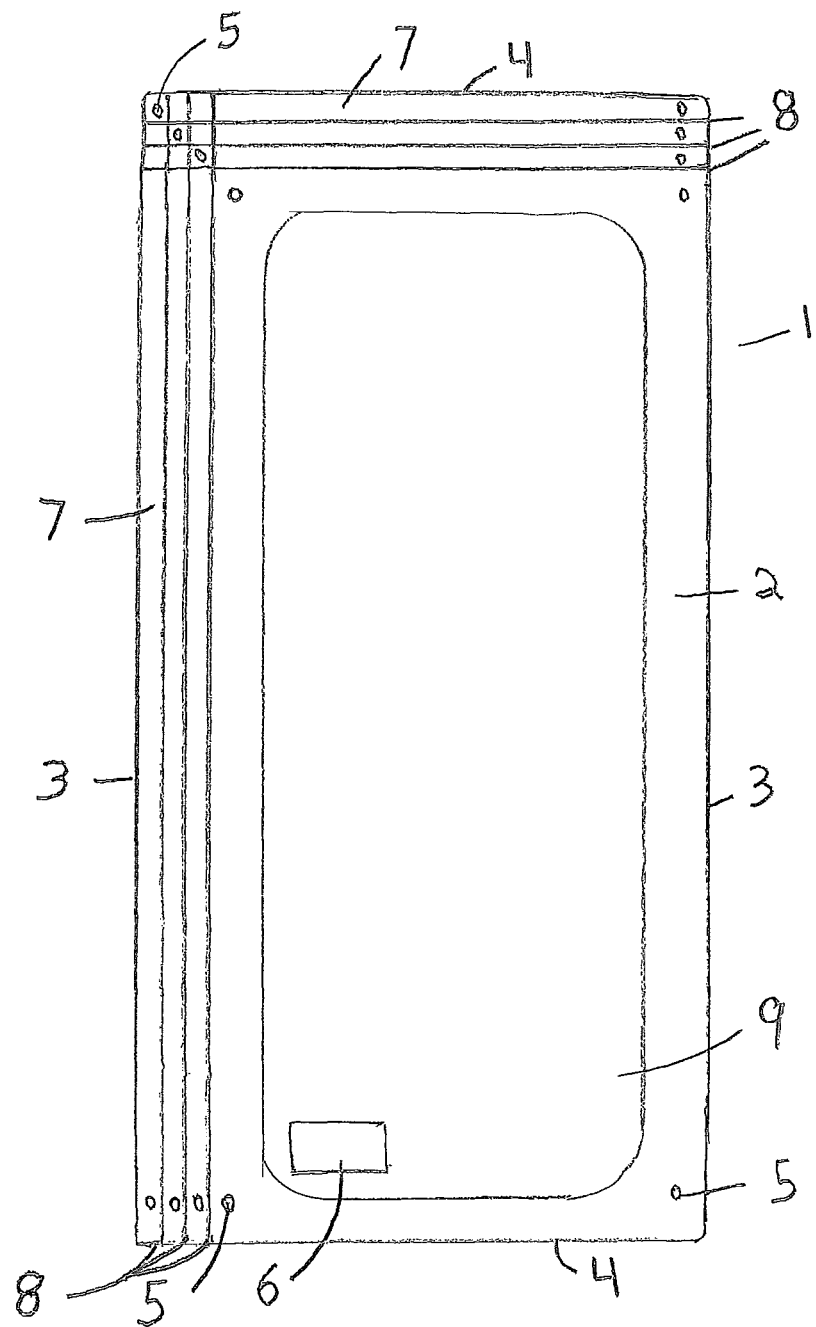
FIG. 3 is a front view again showing the features and the raised portion 9.

I claim:

1. A reusable electrical panel cover for protecting an electrical panel box comprising a sturdy rectangular box-shaped panel cover, the panel cover comprising two length-edge sides and two width-edge sides, a front, a plurality of small openings for attaching the reusable electrical panel cover to an electrical panel box, at least one cutout in the front for access through the reusable electrical panel cover to the electrical panel, and at least one breakaway portion on one width-edge side and at least one breakaway portion on one length-edge side, each breakaway portion further comprising a breakaway edge.

2. The reusable electrical panel cover of claim 1 wherein the electrical panel cover is made of steel, aluminum or a sturdy plastic.

3. The reusable electrical panel cover of claim 2 wherein the steel, aluminum or plastic is thinner along each breakaway edge.

4. The reusable electrical panel cover of claim 1 further comprising a raised portion of the front.

* * * * *